United States Patent
Koskela et al.

(10) Patent No.: US 10,959,282 B1
(45) Date of Patent: Mar. 23, 2021

(54) 5G BEAM GROUP DISCONTINUOUS RECEPTION

(71) Applicant: Nokia Technologies Oy, Espoo (FI)

(72) Inventors: Timo Koskela, Oulu (FI); Samuli Turtinen, Ii (FI); Sami-Jukka Hakola, Kempele (FI); Mihai Enescu, Espoo (FI); Juha Pekka Karjalainen, Oulu (FI)

(73) Assignee: Nokia Technologies Oy, Espoo (FI)

(*) Notice: Subject to any disclaimer, the term of this patent is extended or adjusted under 35 U.S.C. 154(b) by 321 days.

(21) Appl. No.: 16/317,812

(22) PCT Filed: Aug. 5, 2016

(86) PCT No.: PCT/IB2016/054747
§ 371 (c)(1),
(2) Date: Jan. 14, 2019

(87) PCT Pub. No.: WO2018/025070
PCT Pub. Date: Feb. 8, 2018

(51) Int. Cl.
*H04W 76/28* (2018.01)
*H04B 7/06* (2006.01)

(52) U.S. Cl.
CPC .......... *H04W 76/28* (2018.02); *H04B 7/0617* (2013.01); *H04B 7/0695* (2013.01)

(58) Field of Classification Search
CPC ..... H04W 76/28; H04W 76/00; H04W 76/27; H04W 76/15; H04W 52/02; H04W 52/00;
(Continued)

(56) References Cited

U.S. PATENT DOCUMENTS

2011/0294491 A1* 12/2011 Fong et al. ............... 455/422.1
2014/0029459 A1* 1/2014 Kwon et al. ......... H04W 76/048
(Continued)

FOREIGN PATENT DOCUMENTS

WO 2017/194094 A1 11/2017

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321, V13.0.0, Dec. 2015, pp. 1-82.
(Continued)

*Primary Examiner* — Meless N Zewdu
(74) *Attorney, Agent, or Firm* — Nokia Technologies Oy

(57) ABSTRACT

To better support beamforming in MIMO systems such as 5G, a first match is determined between a first transmit (TX) beam group of a radio network and a first receive (RX) beam group of a user equipment (UE); and also a second match is determined between a second TX beam group of the radio network and a second RX beam group of the UE. For example these matches can come from the UE's beam report with best match information. The network configures the UE with at least a first discontinuous reception (DRX) configuration associated with the first RX beam group and with a second DRX configuration associated with the second RX beam group. In this case the first and second DRX configurations are active simultaneously for the UE, and each said beam group comprises at least one antenna or antenna port.

20 Claims, 9 Drawing Sheets

(58) Field of Classification Search
CPC ....... H04W 76/10; H04W 76/20; H04W 4/50; H04W 16/28; H04W 72/046; H04W 88/00; H04W 88/02; H04W 88/07; H04B 7/06; H04B 7/0695; H04B 7/0617; H04B 7/0408; H04B 7/07; H04B 7/0404; H04B 7/04; H04B 7/0413; H04B 7/024; H04B 7/0686; H04B 7/08; H04B 7/0693; H04B 7/061; H04B 7/02; H04B 2201/7071; H04B 2201/70707; H04B 2201/70709
See application file for complete search history.

(56) References Cited

U.S. PATENT DOCUMENTS

| | | |
|---|---|---|
| 2014/0128109 A1 | 5/2014 | Li et al. |
| 2014/0198681 A1* | 7/2014 | Jung et al. ............ H04W 24/10 |
| 2014/0198696 A1* | 7/2014 | Li et al. ............ H04W 52/0229 |
| 2015/0078189 A1 | 3/2015 | Kwon et al. |
| 2015/0282080 A1* | 10/2015 | Mattanen et al. ........................... H04W 52/0216 |
| 2015/0282122 A1* | 10/2015 | Kim ...................... H04W 72/04 |
| 2017/0019948 A1* | 1/2017 | Baghel et al. ...... H04W 76/048 |
| 2017/0134124 A1* | 5/2017 | Lee et al. .............. H04L 1/1812 |
| 2018/0375623 A1* | 12/2018 | Suzuki et al. ......... H04L 1/1883 |
| 2019/0089420 A1* | 3/2019 | Koskela et al. ..... H04B 7/0408 |

OTHER PUBLICATIONS

International Search Report and Written Opinion received for corresponding Patent Cooperation Treaty Application No. PCT/IB2016/054747, dated Apr. 21, 2017, 13 pages.

Kwon et al., "Performance Analysis of DRX Mechanism Considering Analogue Beamforming in Millimeter-Wave Mobile Broadband System", IEEE Globecom Workshops (GC Wkshps), Dec. 8-12, 2014, pp. 802-807.

* cited by examiner

5G BEAM GROUP DISCONTINUOUS RECEPTION

RELATED APPLICATION

This application was originally filed as PCT Application No. PCT/IB2016/054747 on Aug. 5, 2016.

TECHNOLOGICAL FIELD

The described invention relates to wireless communications, and more particularly to feedback signaling for beamforming purposes in a multiple input-multiple output (MIMO) radio environment such as for example the massive MIMO arrays projected for 5G radio access technology (RAT) systems being developed to operate in the millimeter-wave (mmWave) spectrum.

BACKGROUND

Wireless radio access technologies continue to be improved to handle increased data volumes and larger numbers of subscribers. The 3GPP organization is developing $5^{th}$ Generation (5G) wireless networks (aka New Radio (NR)) to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; and also to support massive MIMO (m-MIMO). M-MIMO systems are characterized by a much larger number of antennas as compared to 4G systems, as well as finer beamforming and a higher antenna gain. For example, a 5G system operating at a carrier frequency of 28 GHz and with a system bandwidth of 800 MHz is to be demonstrated at the 2018 winter Olympics.

To compensate the increased path loss when operating on higher frequencies, beamforming is seen essential for providing adequate cell coverage. In this regard different transceiver architectures are being considered for 5G radio access system: digital, analogue or so-called hybrid which utilizes digital baseband precoding and analog beamforming. Such hybrid or even fully analogue architectures are intended for 5G deployment where the number of antenna elements required for cell coverage may range from tens to hundreds. Systems deployed to lower frequencies (~sub 6 GHz) are typically implemented by using fully digital architecture, and fully digital architectures can certainly also be implemented for 5G signal processing.

As with any modem radio system, discontinuous reception (DRX) is an important concept to enable power savings at the mobile terminals, generally termed user equipments (UEs). At higher carrier frequencies a given UE may be equipped with multiple antenna panels and operate using non-omnidirectional beams. Furthermore, to provide robustness against (antenna beam or antenna beam group) blockages a given UE may have candidate serving base station (BS) beams from multiple transmit-receive points (TRPs) associated with the different UE beams.

FIG. 1 is a prior art timing diagram showing the general concept of DRX, for example in the LTE system. During the ON period the UE is expected to monitor its active frequency in case there is signaling from the network such as a resource allocation for data or a call, specific to LTE this is when the UE blind decodes PDCCHs in its search space to see if there are any that schedules a resource allocation (PDSCH or PUSCH) for it. During the OFF period the UE may be able to operate at a reduced power, shutting down certain internal processes/hardware to conserve power. In any given cycle it may be the UE is not able to de-power due to ongoing data exchanges that are not yet complete by the end of the ON period; for example, the allocated PUSCH, a persistent allocation or an open HARQ process might extend into the OFF period. For this reason FIG. 1 characterizes the OFF period as only a DRX opportunity rather than simply DRX. In LTE a given UE may be configured with a short and a long DRX cycle, where the long DRX cycle activates after inactivity during a number N of consecutive short DRX cycles. A long DRX cycle may have longer OFF period than a short DRX cycle, and it also may have different DRX ON cycle length.

Neither the LTE system nor any other radio access technology of which the inventors are aware considers DRX from the perspective of any antenna beam groupings. It would be advantageous to adapt the DRX concept to exploit power saving efficiencies in a radio environment such as 5G that utilizes antenna beam groupings.

BRIEF SUMMARY

In accordance with a first aspect of these teachings there is a method comprising: determining a first match between a first transmit (TX) beam group of a radio network and a first receive (RX) beam group of a user equipment (UE); determining a second match between a second TX beam group of the radio network and a second RX beam group of the UE; and configuring the UE with at least a first discontinuous reception (DRX) configuration associated with the first RX beam group and with a second DRX configuration associated with the second RX beam group. In this case the first and second DRX configurations are active simultaneously for the UE, and each said beam group comprises at least one antenna or antenna port.

In accordance with a second aspect of these teachings there is an apparatus comprising at least one processor and at least one memory tangibly storing a computer program. In this aspect the at least one processor is configured with the at least one memory and the computer program to cause the apparatus to perform actions comprising: determine a first match between a first transmit (TX) beam group of a radio network and a first receive (RX) beam group of a user equipment (UE); determine a second match between a second TX beam group of the radio network and a second RX beam group of the UE; and configure the UE with at least a first discontinuous reception (DRX) configuration associated with the first RX beam group and with a second DRX configuration associated with the second RX beam group such that the first and second DRX configurations are active simultaneously for the UE. Each said beam group comprises at least one antenna or antenna port.

In accordance with a third aspect of these teachings there is a computer readable memory tangibly storing a computer program. When such a computer program is executed it causes a radio access node to perform actions comprising: determine a first match between a first transmit (TX) beam group of a radio network and a first receive (RX) beam group of a user equipment (UE); determine a second match between a second TX beam group of the radio network and a second RX beam group of the UE; and configure the UE with at least a first discontinuous reception (DRX) configuration associated with the first RX beam group and with a second DRX configuration associated with the second RX beam group such that the first and second DRX configurations are active simultaneously for the UE. As with the above embodiments each beam group comprises at least one antenna or antenna port.

In a further aspect of these teachings an apparatus comprising at least processing means and radio communication means. The processing means is for determining a first match between a first transmit (TX) beam group of a radio network and a first receive (RX) beam group of a user equipment (UE); and further for determining a second match between a second TX beam group of the radio network and a second RX beam group of the UE. The radio communication means is for configuring the UE with at least a first discontinuous reception (DRX) configuration associated with the first RX beam group and with a second DRX configuration associated with the second RX beam group such that the first and second DRX configurations are active simultaneously for the UE. In one example the processing means comprises one or more processors with implementing software stored on a memory, and the radio communication means comprises a radio with corresponding antenna(s).

In accordance with a fourth aspect of these teachings there is a method comprising: determining a first match between a first transmit (TX) beam group of a radio network and a first receive (RX) beam group of a user equipment (UE); determining a second match between a second TX beam group of the radio network and a second RX beam group of the LTE; and in response to the UE being configured by the radio network, operating the UE with at least a first discontinuous reception (DRX) configuration associated with the first RX beam group and with a second DRX configuration associated with the second RX beam group such that the first and second DRX configurations are active simultaneously for the UE. As above each said beam group comprises at least one antenna or antenna port.

In accordance with a fifth aspect of these teachings there is an apparatus comprising at least one processor and at least one memory tangibly storing a computer program. In this aspect the at least one processor is configured with the at least one memory and the computer program to cause the apparatus to perform actions comprising: determine a first match between a first transmit (TX) beam group of a radio network and a first receive (RX) beam group of a user equipment (UE); determine a second match between a second TX beam group of the radio network and a second RX beam group of the UE; and in response to the UE being configured by the radio network, operate the UE with at least a first discontinuous reception (DRX) configuration associated with the first RX beam group and with a second DRX configuration associated with the second RX beam group such that the first and second DRX configurations are active simultaneously for the UE. Each said beam group comprises at least one antenna or antenna port.

In accordance with a sixth aspect of these teachings there is a computer readable memory tangibly storing a computer program. When such a computer program is executed it causes a user equipment to perform actions comprising: determining a first match between a first transmit (TX) beam group of a radio network and a first receive (RX) beam group of the user equipment (UE); determining a second match between a second TX beam group of the radio network and a second RX beam group of the UE; and in response to the UE being configured by the radio network, operating the UE with at least a first discontinuous reception (DRX) configuration associated with the first RX beam group and with a second DRX configuration associated with the second RX beam group such that the first and second DRX configurations are active simultaneously for the UE. And for this aspect also each beam group comprises at least one antenna or antenna port.

In a further aspect of these teachings there is an apparatus comprising at least processing means and radio communication means. The processing means is configured to determine a first match between a first transmit (TX) beam group of a radio network and a first receive (RX) beam group of a user equipment (UE); and further to determine a second match between a second TX beam group of the radio network and a second RX beam group of the UE; and in response to the UE being configured by the radio network. The radio communication means is configured to operate the UE with at least a first discontinuous reception (DRX) configuration associated with the first RX beam group and with a second DRX configuration associated with the second RX beam group such that the first and second DRX configurations are active simultaneously for the UE. In one example the processing means comprises one or more processors with implementing software stored on a memory, and the radio communication means comprises a radio with corresponding antenna(s).

DETAILED DESCRIPTION

Figure 1:
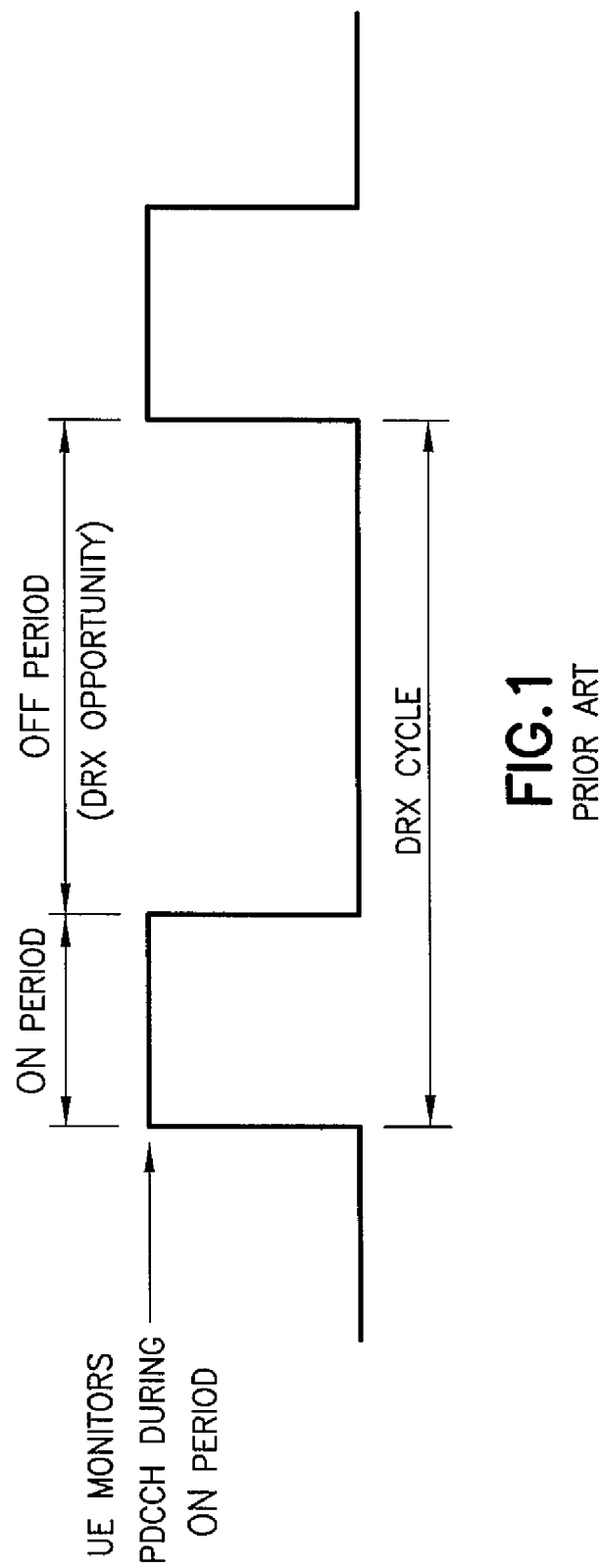
FIG. 1 is a timing diagram illustrating a generic discontinuous reception (DRX) cycle in a cellular radio system such as LTE.
Figure 2:
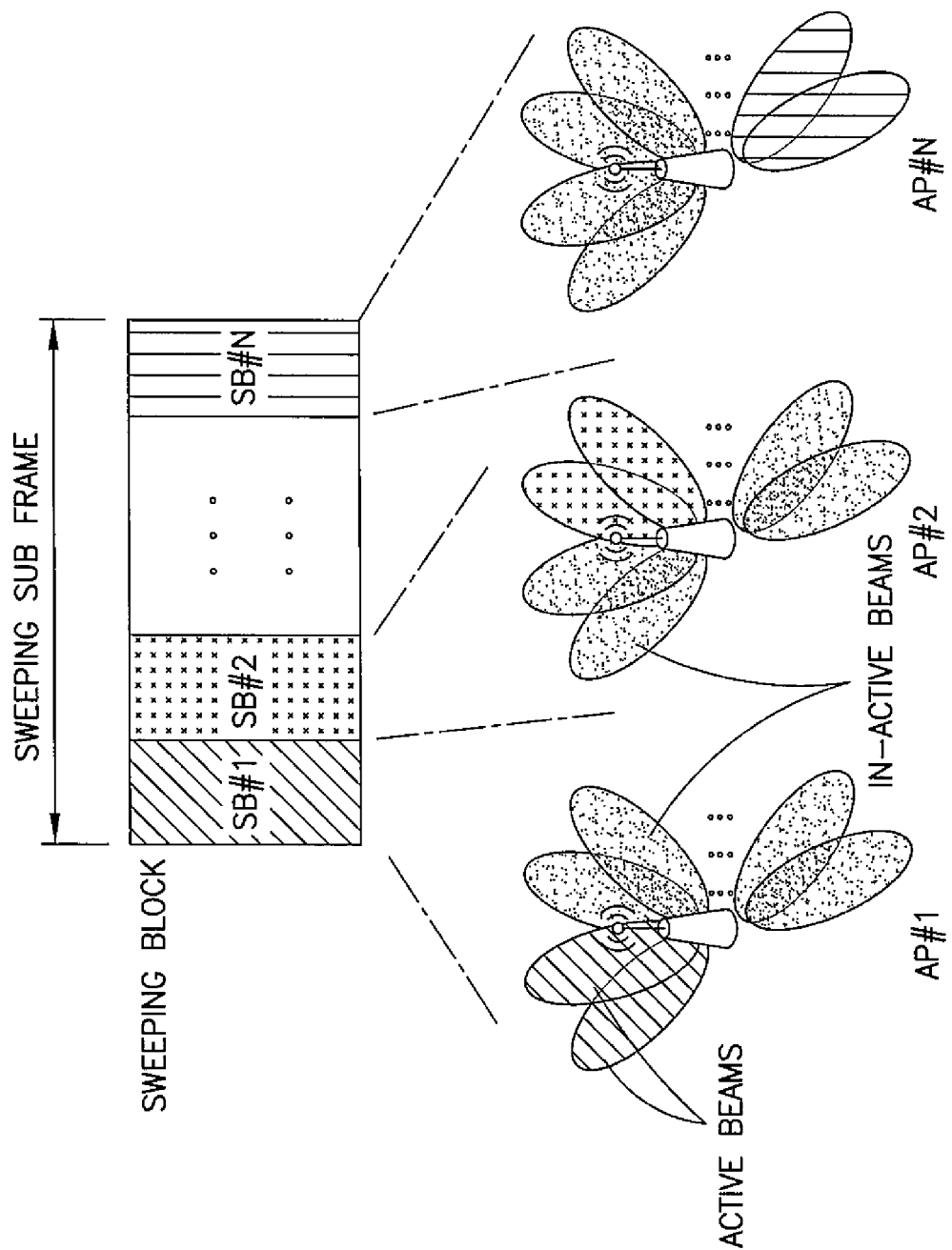
FIG. 2 is a plan view illustration of a sweeping subframe of a radio frame in which different antenna groups transmit control information in different sweeping blocks of the subframe.

The ongoing development of the 5G radio system specifications has introduced what is referred to as a sweeping subframe which is to provide coverage for common control channel signaling with beam forming. A sweeping subframe consists of sweeping blocks (SB) where a single block covers a specific area of the cell with a set of active antenna beams. FIG. 2 illustrates an example of such a sweeping subframe, which is divided into blocks (time division duplexed or chronologically separated blocks as illustrated) where each block is associated with a group of antenna beams from a given access node. A similar sweeping subframe can also be used for frequency division duplexing (FDD) particularly at higher end carrier frequency bands; at lower frequency bands beamforming of common channels may not be needed. As shown, SB #1 is associated with the group of beams of access point (AP) #1 that are marked as active and shown by hashed shading, and respecting SB #1 all other beams of AP #1 are considered inactive as marked and shown by shadowing. Similarly, SB #2 is associated with the group of beams of AP #2 that are shown by dotted shading and with respect to SB #2 all other beams of AP #2 are considered inactive as shown by shadowing. This continues for all the APs having a corresponding SB in the sweeping subframe, of which the last is represented in FIG. 2 as ANN where N is a positive integer greater than one. While not specifically shown, a sweeping subframe may be arranged such that different groups of antenna beams of a same AP are associated with different SBs, preferably non-adjacent SBs within the sweeping subframe. As the reader might imply from FIG. 2, in a 5G deployment the total number of beams required to cover a required cell area will typically be much larger than the number of concurrent active beams the access point is able to form. Therefore access points needs to sweep through the cell coverage area in the time domain by activating different set of beams on each SB.

Consider a more specific example of a sweeping subframe in the downlink (DL) direction that provides downlink common control channel coverage. In this example each SB carries essential cell access information such as DL synchronization signals, system information such as MIB, SIB or the like (including PRACH/RACH configurations), paging, and any control information that needs to be broadcasted in a cell. In another example for the uplink (UL) direction the sweeping subframe/subframes may accommodate resources for random access channel or other uplink channels requiring periodic availability such as SR (scheduling request) and SRS (sounding reference symbol).

Also relevant to the development of 5G radio system technology is the idea of UE beam grouping. For this typically the UE will perform some measurements to establish linkage between the radio network's communication beams (which are DL transmit/TX beams) and the UE's own receive (RX) beam direction. It is known to base such beam measurements on beam specific reference signals (BRS), beam refinement reference symbols, demodulation reference symbols (DMRSs) used for control channel decoding, DMRSs used for data decoding, and the like. Further, assuming reciprocity between uplink and downlink (e.g. in TDD system) the established linkage between network's TX beams and UE's RX beams applies also for reverse link direction.

Figure 3:
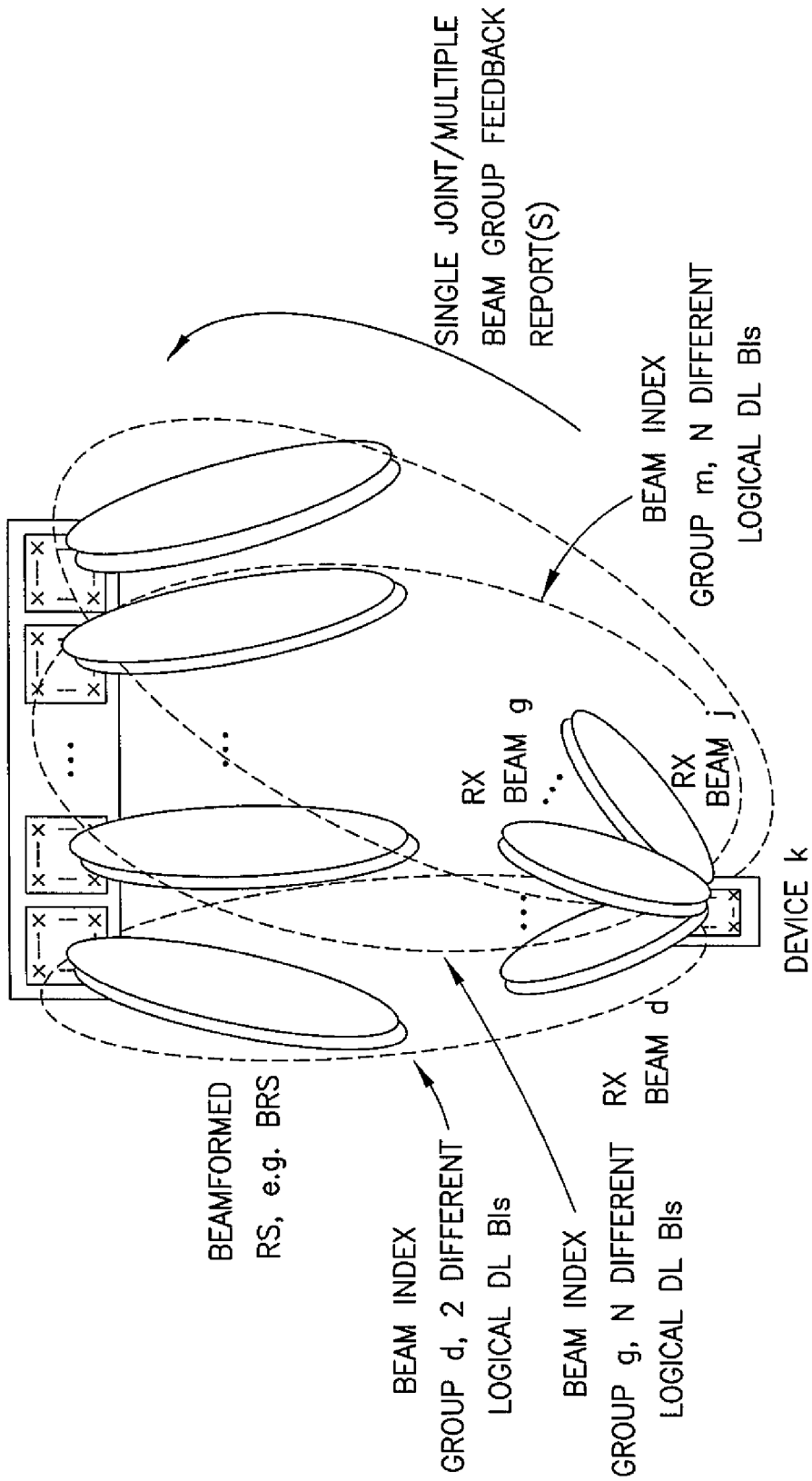
FIG. 3 is a plan view illustration of TX beams co-located at one transmit-receive point TRP and one UE, designated device k, with three different RX antenna groups and illustrates the concept of beam matching which is relevant to these teachings.
Figure 4:
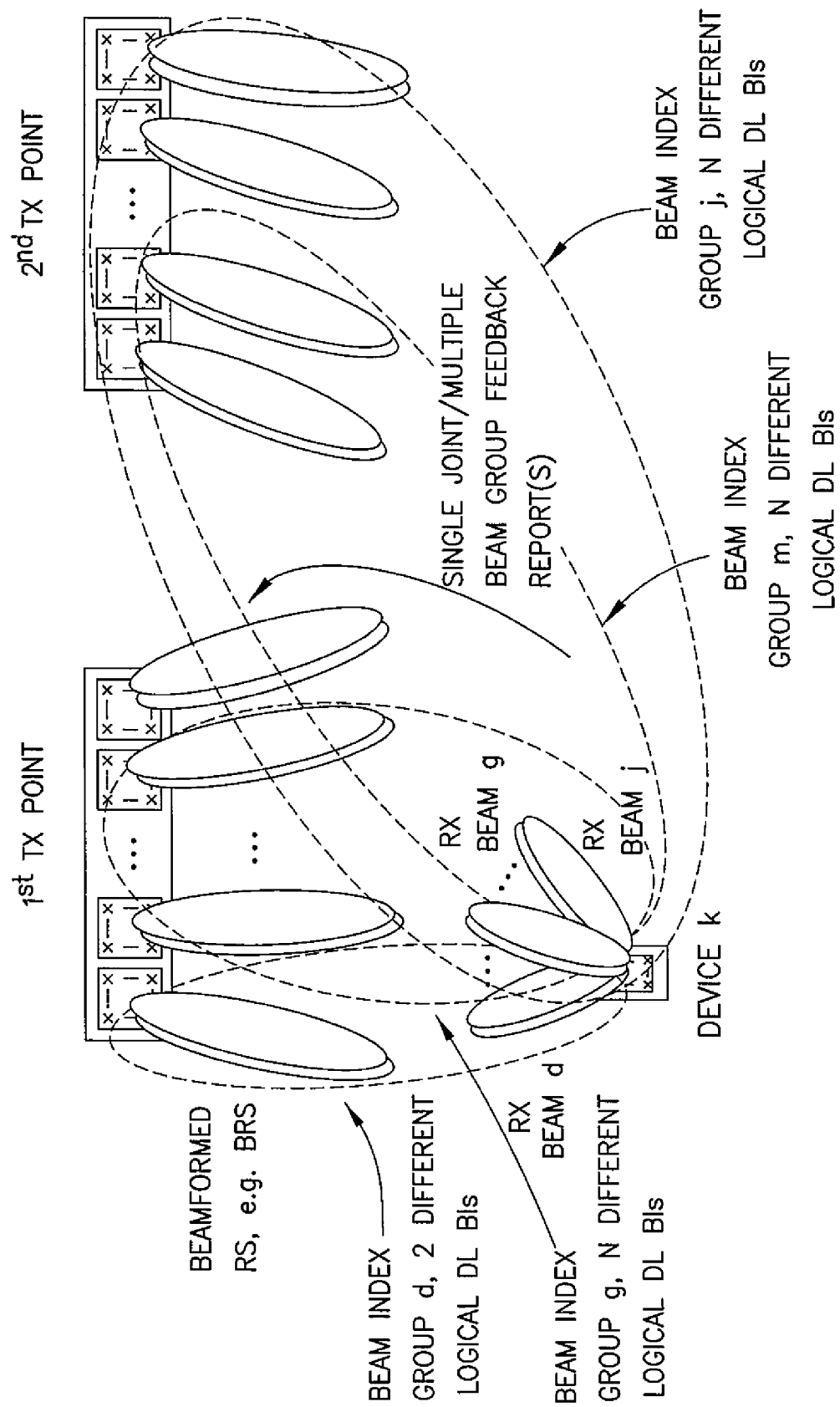
FIG. 4 is a plan view similar to FIG. 3 except that the TX beams are non co-located and dispersed among a first TRP and a second TRP.

UE beam grouping is more easily explained graphically and in that regard FIG. 3 illustrates an example of a single transmit-receive point (TRP) in which all the relevant DL TX antennas are considered to be co-located while FIG. 4 illustrates an opposite example of multiple TRPs in which all the relevant DL TX antennas are not co-located. For simplicity a single TRP may be considered as one (conventional) AP though in some 5G deployments it may be that a single AP controls non co-located antennas in which case that AP represents a multi TRP. It is the location of the TX antennas that distinguish single from multiple TRP; antennas of a single array are generally considered to be co-located for purposes of UE beam grouping. One further example case of non co-located DL TX antennas is a scenario where the $1^{th}$ TX point and $2^{nd}$ TX point in FIG. 4 are different cells. In the radio arts this is sometimes referred to as dual (multi) connectivity, where the UE is connected to at least two cells.

For UE beam grouping it is the UE that is making the measurements on the DL signals/symbols it receives from the network. The UE may be able to detect multiple network communication beams per its own RX direction, and also it may detect the same network communication beam using different of its own RX beams. In the FIG. 3 example there are 3 beam index groups, marked with the dashed ovals, indicated as beam index group d, g and m. Each of these beam index (BI) groups is associated with a different set of DL TX beams where each BI group can consists of single or multiple logical beam indices. Here, the far left pair of DL beams are identified as beam index group d (which groups N=2 DL BIs); the central four DL beams are designated as beam index group g (which groups N=4 DL BIs), and the rightmost four DL beams are designated as beam index group m (which also groups N=4 DL BIs).

While the UE can in theory measure nearly any TX beam with nearly any of its RX antennas, the goal is to find the best matches between TX beam groups and RX antennas or groups of RX antennas so it is useful that the UE reports only those 'best' matches—those with the best signal quality or highest signal strength for example. There may be a threshold minimum under which the UE would not include that result in its beam report, so for example if the BS configures the UE to report the P=3 best matches and only 2 such measurements exceed the minimum strength/quality threshold the UE would then include only 2 matches in its report. Given how the beams are depicted in FIG. 3, it is reasonable to assume that the UE (designated as device k) can measure the following beam combinations to have a quality/strength that exceeds the minimum reporting threshold:

DL beam index group d is measured with UE RX beam d;

DL beam index group g is measured with UE RX beam g and with UE RX beam j; and

DL beam index group m is measured with UE RX beam g and with UE RX beam j.

The UE processes the measurement results per beam index group and computes a beam report to signal the linkage to the network. This beam report may be sent upon request by the network, or it may be triggered by a specific event. The beam report generated by the UE indicates the existence of at least two beam groups at the UE side. The measurement report, also more particularly referred to as a beam report, may include N*(Beam index+Qualities (RSRP/RSRQ))+group ID per beam index group having signal quality or signal strength above some threshold1 (or alternatively the N-best beams) associated with each group.

The UE sends this beam report to the network (shown in FIG. 3 as the single joint/multiple beam group feedback report), and the UE also maintains beam groups by performing periodical measurements, for instance measuring beam reference signals in downlink sweeping subframes. Reporting of these measurements in a beam report may be periodic, and/or such reporting may be based on trigger conditions—for example if beam quality changes in the groups (relative and/or absolute changes) or detection of new beams and groups, and/or such reporting may be based on on-demand request by the network.

The non-co-located TX antennas shown by example at FIG. 4 are similar; the UE measures per RX direction, finds the N best per beam index group, and includes in its beam report those best N for each RX direction that exceed the minimum signal strength/quality for reporting. In the FIG. 4 example there are 3 beam index groups, same as FIG. 3. On the transmit side the non co-located antennas dispersed among first and second transmission points are grouped by the dashed ovals as follows. For the first TX point the far left pair of DL beams are beam index group d (same as FIG. 3); the central two antenna pairs are beam group g (same as FIG. 3); and the remaining rightmost antenna pair of the first TX point is not in any beam group. For the second TX point the two far left pairs of DL beams are beam index group n; and all four antenna pairs are beam index group j. RX antennas can be matched with TX beams for the non co-located case of FIG. 4 similar as described above for the co-located case of FIG. 3. In one example, in case the UE is able to form multiple beams concurrently it may consider for example beam group d and beam group g may be considered as one logical 'beam group y' when reporting beam information to the network. The UE may also report beam information in such a manner that it reports for example group d, group g and group y (of the previous example).

Now with the network receiving the beam group information feedback from the UE, the network can first check that the UE has indicated at least two beam groups based on the downlink beam reference signal measurements (assuming in this example the network required the UE to report the two best groups per the above tabular example), and then it can determine the number of beam groups the UE monitors based on that UE feedback.

With the above beamforming background in mind, according to an embodiment of these teachings the network then configures the UE for communication periods specific for the different beam groups, assuming at least two beam groups have been determined and reported by UE. The network can then signal to the LIE a first DRX configuration corresponding to a first beam group and signal to the UE at least one additional DRX configuration for the at least one additional beam group.

In one particular embodiment the first DRX configuration is a default configuration and the first beam group (or groups) are the current serving beam groups. In this regard certain parameters of the default configuration such as DRX cycle duration and duration of the ON period may be broadcast in the cell or published in a radio access technology specification as default parameters, while other parameters such as which subframe the DRX cycle starts could be signalled to the UE by the network to ensure the ON period overlaps the UE's blind decoding search space in which the UE is to look for scheduling grants. For the case in which the default DRX configuration is such that by default the ON period aligns with the start of the UE's blind decode search space, this network signalling of the default DRX configuration may be implicit in the network's configuring of the UE with its blind decoding search space. The total number of "active beam groups" may depend on the UE's capability of communicating simultaneously using multiple beam groups. Furthermore, the specific beam groups that can be active at the same time may depend on the UE's capability; the UE may assist the network about such information in a configuration/report message such as a measurement report.

As to the second or additional beam group the network indicates to the UE in signalling the additional beam group or groups to which the at least one additional DRX configuration applies. In this regard the second or additional DRX configuration may apply for more than only one secondary beam group, or there may be multiple additional DRX configurations each of which applies to a different additional beam group. In a practical deployment the number of "secondary beam groups" may depend on UE capability of communicating simultaneously using multiple beam groups. Said another way, the network may configure a DRX cycle per reported beam group, where the total number of beam groups having the same DRX cycle may depend on the UE's capability of communicating/monitoring using multiple beam groups simultaneously.

Figure 5:
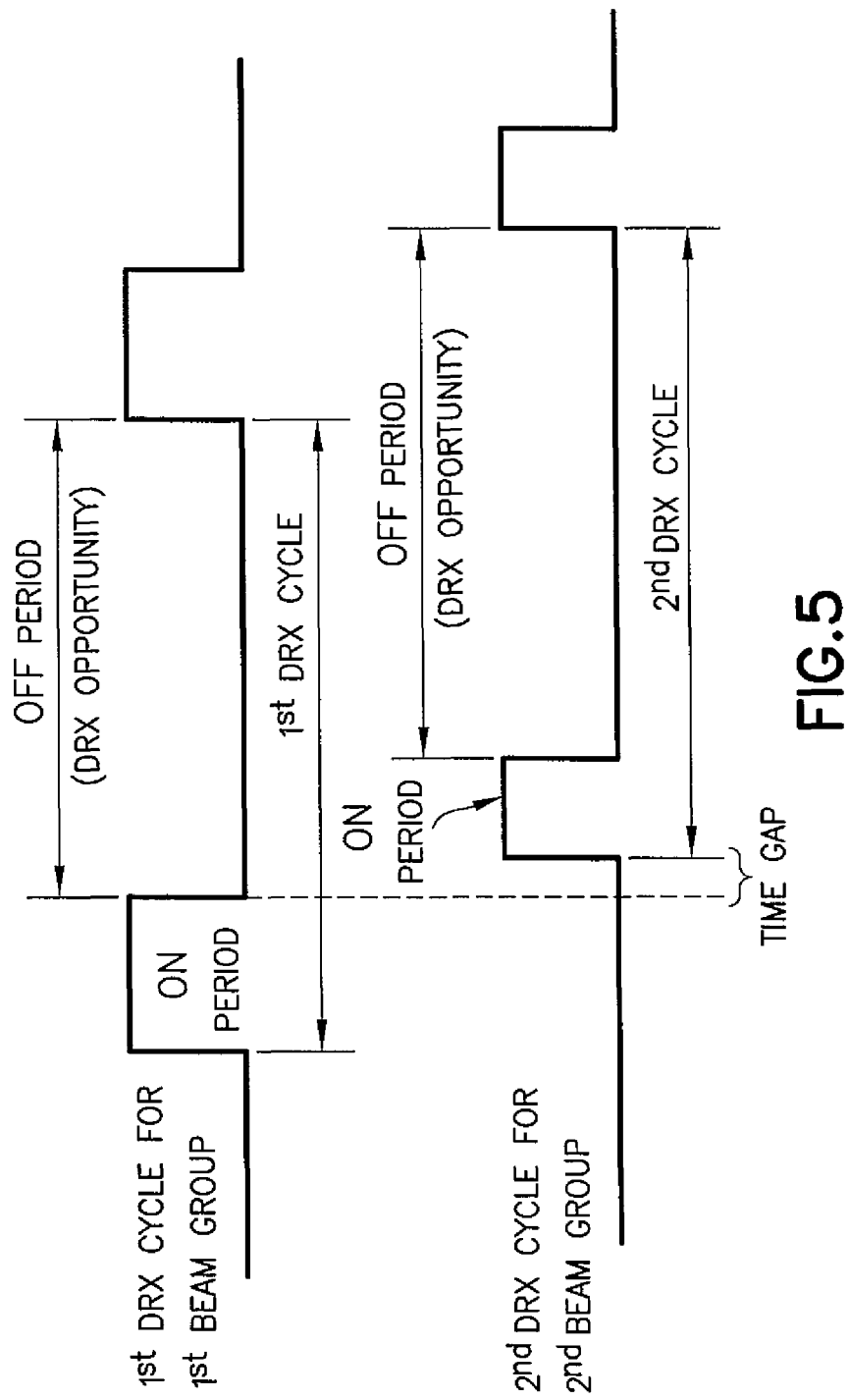
FIG. 5 is a timing diagram similar to FIG. 1 except showing two different DRX cycles running simultaneously for different beam groups of a single UE, according to an exemplary embodiment of these teachings.

In one particular embodiment, for a given UE that reports multiple beam groups and the network configures it with group specific DRX configurations, the network may arrange these multiple DRX configurations to have non-overlapping DRX ON cycles, as shown at FIG. 5 which illustrates a special case in which both DRX cycles are of equal length and there is a time gap between the respective ON periods. In that FIG. 5 implementation the duration of DRX ON cycles/periods of the secondary DRX configurations are configured to be shorter than the DRX ON cycles/periods of the first DRX configuration, and the network can configure this different DRX ON cycle length even if the total length of the DRX duration is not the same as it is in FIG. 5. In a further implementation the secondary DRX cycle(s) may use the ON/OFF cycle of a pattern of the first longer DRX cycle, such that the first and longer DRX cycle is an integer multiple of the second and shorter DRX cycle and the first/longer DRX cycle would have a longer OFF duration, which can be used after a longer period of inactivity. In a still further implementation the shorter DRX cycle may be configured for the first (serving) beam group, while the longer DRX cycle(s) is/are configured for the secondary beam group(s).

In one embodiment if a given UE indicates it can monitor multiple beam groups the network may configure the monitored groups with similar DRX cycles. In this regard similar DRX cycles means identical DRX cycle lengths though the respective ON and OFF periods may differ. FIG. 5 illustrates this embodiment.

In one embodiment that can be used with any of the various DRX cycle configurations above, the network provides inter-group signalling for switching DRX cycles on or off (activate or inactivate). For example, if a given UE is configured with first and second DRX cycles for respective first and second beam groups and both DRX cycles are currently active, the network can switch off the DRX period of the second beam group/second DRX cycle using signaling it sends to the UE via the first beam group. Such signaling may relate to the network switching which of the network's beam groups will be the serving beam group for this UE, as this network beam switch procedure typically also involves a beam change (beam group change) at the UE side. See for example the RX/TX beam matching at FIGS. 3-4.

In a particular embodiment, the beam group which currently has a serving beam or set of beams determines the use of the first DRX configuration. Specifically, during communication the network may explicitly indicate to the UE some change of the currently serving beam set/beam group to an alternative group. This change implicitly affects the DRX cycle configuration so that the indicated beam group, which is then the new serving group, is following the first DRX cycle. The previous serving beam group may adapt the second, or secondary DRX cycle, or the network may configure a new DRX cycle for it. Consider this example with respect to MG. 5, where initially the serving beam group is the first beam group referred to as group A and the second non-serving beam group is referred to as group B. The network explicitly informs the UE to switch to beam group B as its serving beam group. This may be implemented by the network informing the UE of a change to the network's serving TX beam group, which the UE knows from the beam reports it has sent that the best match to this new network TX beam group will be UE beam group B. Now with the UE's serving beam group changed to group B, the UE automatically applies the $1^{st}$ DRX cycle to beam group B and the $2^{nd}$ DRX cycle to the formerly serving beam group A.

In a particular embodiment the network may configure the UE with beam group specific uplink resources, for example resources for the UE to send scheduling requests or RACH preambles (by which the UE requests to establish a network connection). In this regard, the beam group specific uplink resource on which the UE chooses to send its uplink request implicitly indicates to the network that the UE prefers to get served on the beam group associated with that beam group specific uplink resource. In one implementation the beam group specific uplink resources are dedicated (e.g., not shared with other UEs). In a variation of the above example there can be a single uplink resource for either beam group and the UE identifies its preferred beam group by masking its transmission/request on that uplink resource with a beam group specific mask code, so that in some instances its request on the uplink resource indicates by a first masking code that the UE prefers to be served on beam group A and in other instances it's request on the same uplink resource indicates by a second masking code that the UE prefers to be served on beam group B. In this example, 'same' uplink resource refers to different chronological instances of the same logical radio resource, for example the UE's first PUCCH candidate in subframe index number 2 but in two different radio frames.

As mentioned above it may be that the DRX cycle of the second/additional DRX configuration is a multiple of the first DRX cycle. More generally, the first and second/additional DRX configurations may be constrained such that there is some relation between them such that the additional DRX cycle is derived from the first cycle. This derivation may be DRX cycle length as in the example above where one is an integer multiple of the other, or it may be in other characteristics of the DRX cycle such as for example the length of the respective ON periods. This would save the signalling effort as two completely different sets of DRX configuration parameters would not need to be configured explicitly but instead only one set and possibly its derivation relation to the other. For example, such a derivation relation may be an integer number relating to the cycle length derived from the first cycle and/or an offset which indicates the second DRX ON duration derived from the first DRX ON duration.

In one embodiment the network may schedule the UE via one beam group such as for example the first beam group associated with the first DRX configuration, and issue the HARQ feedback via the other beam group such as the second beam group associated with the second DRX configuration. The advantage here is that this embodiment enables the beam group associated with the first DRX configuration to go into DRX as soon as possible, even before all the HARQ processes associated with data transmissions sent from or received at the first beam group are closed out.

Figure 6:
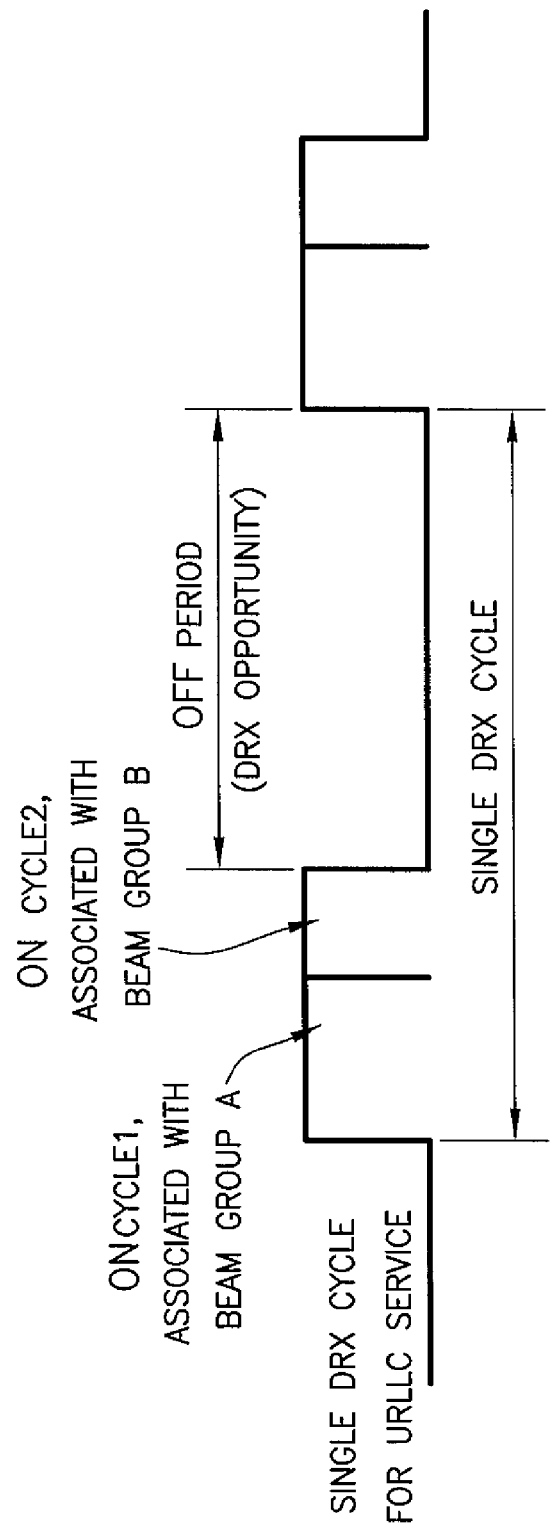
FIG. 6 is a timing diagram similar to FIG. 1 except showing two different ON periods in a single DRX configuration, each ON period associated with a different beam group, according to an exemplary embodiment of these teachings that is particularly advantageous for high reliability service.

In some instances the UE will require what is known in the radio arts as ultra-reliable low latency communication (URLLC) service. In these cases, when the network configures the UE for such URLLC service and the UE reports at least two beam groups to the network, the network may for example configure DRX patterns for URLLC service using a single DRX configuration with two ON periods as shown in FIG. 6. First the network can configure monitoring cycles: ONcycle1 and ONcycle2, each ON period/cycle spanning a number of sub frames. FIG. 6 shows these different ON periods/cycles as having different durations but in some implementations they may have the same duration. During ONcycle1 the UE monitors for a PDCCH that addresses this UE on its RX beam(s) that is/are associated with its beam group A, and during ONcycle2 the UE monitors for such a PDCCH on its RX beam(s) that is/are associated with beam group B. A full cycle in this particular example would then consist of the durations of one ONcycle1 and one ONcycle2 (this particular example excludes the OFF period shown at FIG. 6, which is relevant for a different example detailed further below).

The UE would switch between beam group A and beam group B according to the respective cycle durations. For example, if the beam(s) in group A become blocked, the UE would spend the remainder of the total cycle (ONcycle1+ONcycle2) by monitoring beam group B, and it would further indicate to the network that beam group A cannot be used.

Assuming neither beam group is blocked, during communication the network may schedule this UE by using beams of either group A or group B. Scheduling from either of the group "activates" that current group and in response to such activation the UE would change its cycle so that it spends the total cycle (ONcycle1+ONcycle2) on the current beam group during communication. If the UE detects no activity then the UE starts the original cycle again from the beginning of the next full cycle, monitoring the ONcycle1 with beam group A if no activity there then switching to monitor ONcycle2 with beam group B.

Alternatively or additionally, an OFF cycle may be a part of the overall DRX cycle having two ON periods/cycles as is shown at FIG. 6. In this implementation, during the OFF period if there are no more scheduled resources allocated to the UE and there are no open HARQ processes the UE does not monitor group A or group B but is allowed to go into DRX to conserve energy. In this case a full DRX cycle would consist of one ONcycle1 duration and one ONcycle2 duration and one OFF cycle duration, as FIG. 6 illustrates.

For any of the above embodiments the network may implicitly indicate a change to the UE's serving beam group by scheduling a grant of a radio resource using the beam(s) of the non-serving beam group during the cycle ON time associated with the non-serving beam group.

When choosing what DRX parameters with which to configure the UE, the network can in an example embodiment determine these parameters (that is, determine the beam group DRX configurations) based on TRP information. For example, if the UE has reported in its beam report multiple beam groups which are mapped to different TRPs (such as shown at FIG. 4; the network is assumed to already have this information even though the UE may not have it explicitly), the network may choose to configured beam groups under the same TRP with one configuration. So for example with respect to FIG. 4, the network may choose to associate the UE's beam groups d and g under a first DRX configuration (or first ON period in the case of URLLC service) since those are all matched to TX beams of the $1^{st}$ TRP and to associate the UE's beam group g with the second DRX configuration since beam group g is matched to only TX beams of the $2^{nd}$ TRP.

When considering from the perspective of the network that is configuring multiple UEs with DRX configurations, in one embodiment the network may align the UE specific DRX cycles based on the reported beams or beam groups, for example to balance the number of UEs with an ON duration per beam. Consider an example with respect to FIG. 4; the network may find it advantageous to have a first set of DRX configuration ON periods associated with TX beams of the first TRP aligned and also to have a second set of DRX configuration ON periods associated with TX beams of the second TRP aligned. A given UE can be configured with an ON period from the first set and the second set, while other UEs not utilizing the 2-DRX cycle aspects of these teachings may be configured with a single ON period from only one or the other.

One technical effect of certain of the above embodiments is that configuring a UE with two or more DRX configurations (or a single DRX configuration with two or more ON periods per the URLLC example) improves the reliability of the serving cell connectivity. Another technical effect is that certain embodiments enable improved energy savings at the UE for beam based operations.

Figure 7A:
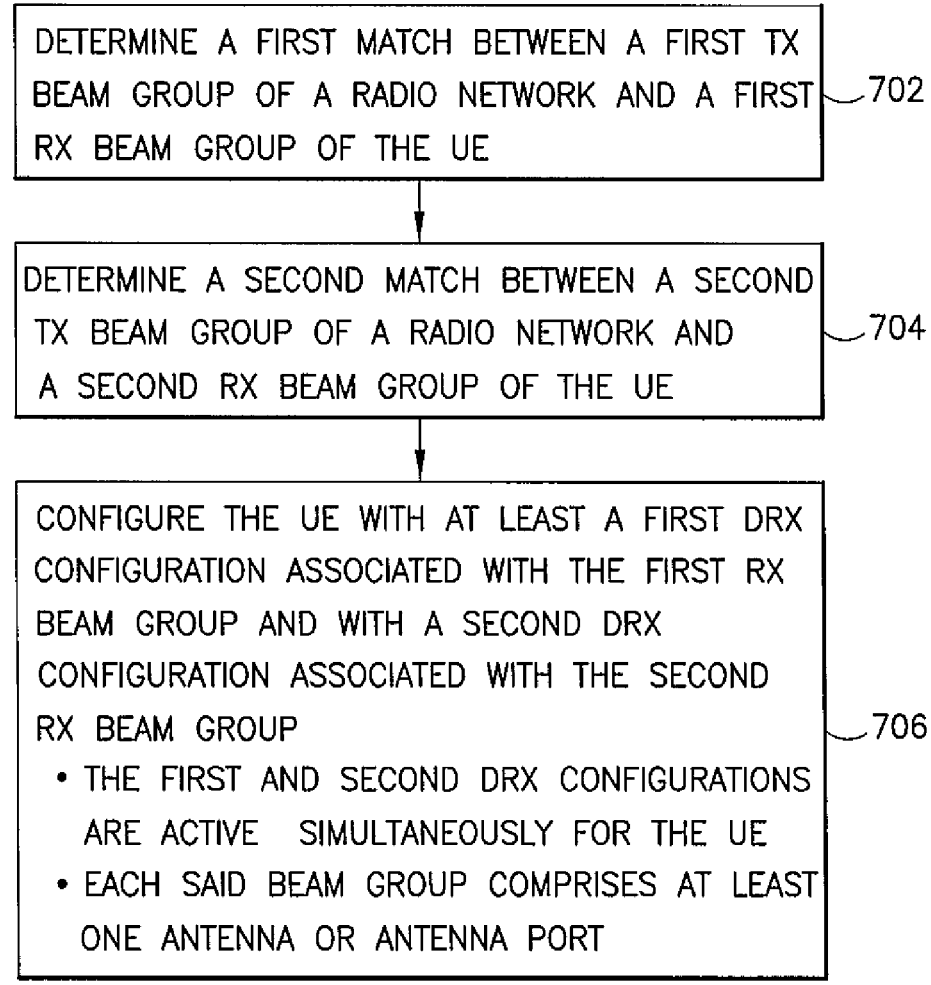
FIGS. 7A-B are process flow diagrams summarizing certain aspects of the invention from the perspective of a radio network and of a user equipment/mobile device, respectively.

FIG. 7A is a flow diagram from the perspective of the radio network that summarizes some of the above features described more particularly above. Such a radio network may include the first TX beam group and the second TX beam group that FIG. 7A mentions, and these TX beam groups may be disposed among one TRP or among multiple TRPs all in the same radio network. At block 702 the network determines a first match between a first TX beam group of a radio network and a first RX beam group of a UE. Similarly at block 704 the network determines a second match between a second TX beam group of the radio network and a second RX beam group of the UE. These different beam groups may or may not be co-located as in the above examples. Then at block 706 the network configures the UE with at least a first DRX configuration associated with the first RX beam group and with a second DRX configuration associated with the second RX beam group. Both these first and second DRX ON period configurations are active simultaneously for the UE, regardless of whether the network sends the configurations at the same time. Further, each of these beam groups comprises at least one antenna or at least one antenna port.

In one particular embodiment for FIG. 7A, the first match and the second match are determined at least in part from a beam report received at the radio network from the UE, where the beam report indicates at least one best match for each of the first and second RX beam groups. In two different embodiments above, the configuring at block 706 was for a single DRX cycle comprising different first and second DRX ON periods, whereas in a different embodiment the configuring of block 706 was configuring the UE with at least a first DRX cycle comprising a first DRX ON period and with a second DRX cycle comprising a second DRX ON period. In the latter case various implementations are detailed above: at least some parameters that define the first DRX cycle are default parameters; the first DRX ON period defines a shorter duration than the second DRX ON period; and a duration of the first DRX cycle is an integer multiple of a duration of the second DRX cycle are some such variations.

Some embodiments concerned switching which FIG. 7A does not specifically address. In these examples the first and second DRX configurations of block 706 define first and second DRX ON periods respectively. In one such embodiment the network switches a serving DRX ON period from the first DRX ON period to the second DRX ON period by sending to the UE signaling via the first TX beam group. In another embodiment the first DRX ON period is always the one for the serving beam groups, so for example when switching a serving beam group from the first RX beam group to the second RX beam group in FIG. 7A then automatically there would be established an association of the second RX beam group with the first DRX ON period and an association of the first RX beam group with the second DRX period to replace the associations shown at block 706.

In a yet further embodiment the radio network also configures for the UE at least one of an uplink resource and a masking code specific for each of the first and second beam groups. In this case then the network would interpret signaling received on the first or second beam group specific uplink resource (or received with the first or second beam group specific masking code as the case may be) as a request by the UE to be served via said first or second beam group.

One particularly unique embodiment had the UE's data and HARQ processes on the different beam groups, so for example if the network allocates a radio resource to the UE via the first TX beam group it would use the second TX beam group for hybrid automatic repeat request signaling associated with the allocated radio resource.

Any or all of these aspects of the invention with respect to FIG. 7A can be embodied as a computer readable memory tangibly storing a computer program that when executed causes a host network radio access node/TRP to perform the actions described above for FIG. 7A. For the case of non-co-located TX beams it is enough that the $2^{nd}$ TRP is under control of the first TRP to the extent that FIG. 7A involves the $2^{nd}$ TRP.

These teachings can further be embodied as an apparatus, such as a network access node/base station or components thereof, comprising at least one processor and at least one memory storing a computer program. In this embodiment the at least one processor is configured with the at least one memory and the computer program to cause the apparatus to perform the actions described above for FIG. 7A.

Figure 7B:
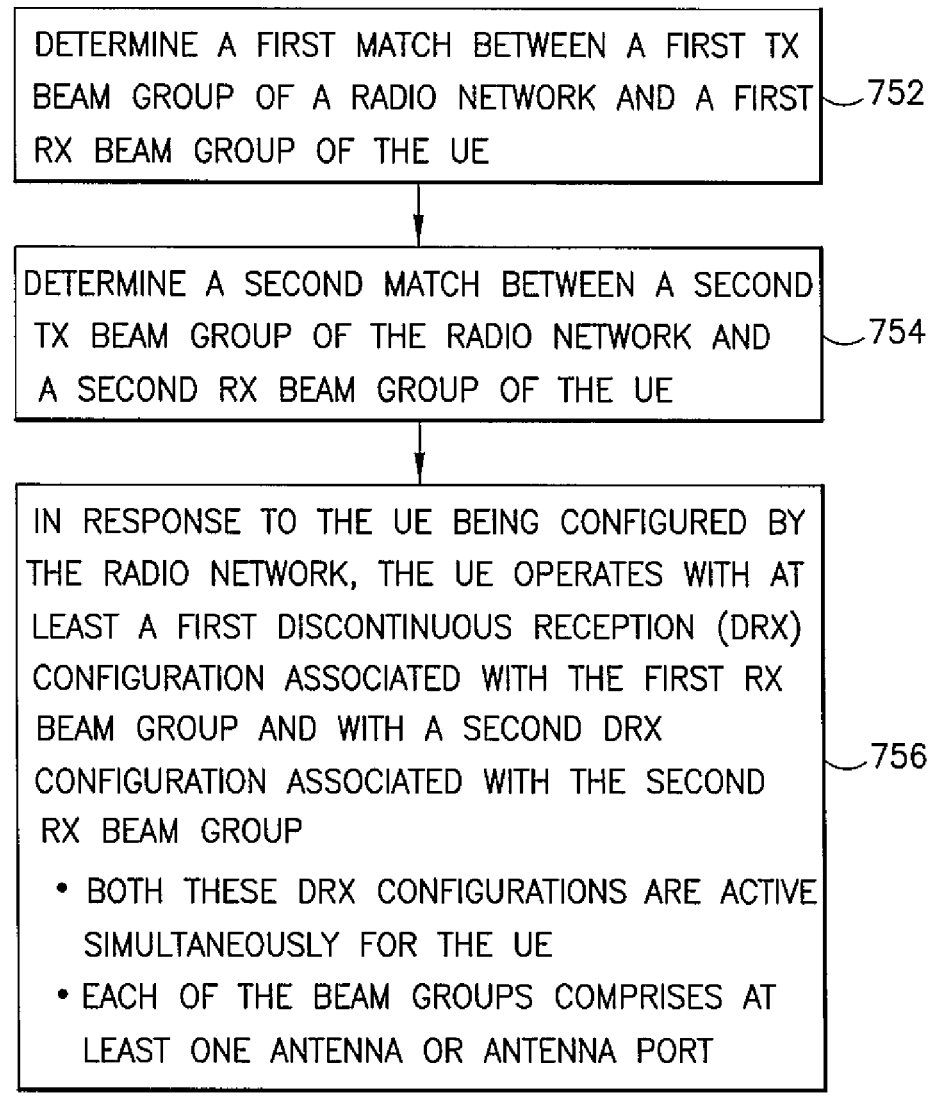

FIG. 7B is a flow diagram of certain aspects of the invention from the perspective of the mobile device/UE that summarizes some of the above features. At block 752 the UE determines a first match between a first transmit (TX) beam group of a radio network and a first receive (RX) beam group of itself, the user equipment (UE). Similarly at block 754 this UE determines a second match between a second TX beam group of the radio network and a second RX beam group of the UE. Then at block 756, in response to the UE being configured by the radio network it operates with at least a first discontinuous reception (DRX) configuration associated with the first RX beam group and with a second DRX configuration associated with the second RX beam group. Both these DRX configurations are active simultaneously for the UE, and each of the beam groups comprises at least one antenna or antenna port.

Further of the above specific embodiments and implementations which are reviewed above from the network perspective of FIG. 7A are of course also relevant from the UE perspective of FIG. 7B.

Each of FIGS. 7A-B themselves can be considered as an algorithm, and more generally represents steps of a method, and/or certain code segments of software stored on a computer readable memory or memory device that embody the respective FIG. 7A-B algorithm for implementing these teachings from the perspective of that respective device (base station or similar radio network access node, or UE). In this regard the invention may be embodied as a non-transitory program storage device readable by a machine such as for example one or more processors of a radio network access node or UE, where the storage device tangibly embodies a program of instructions executable by the machine for performing operations such as those shown at FIGS. 7A-B and detailed above.

Figure 8:
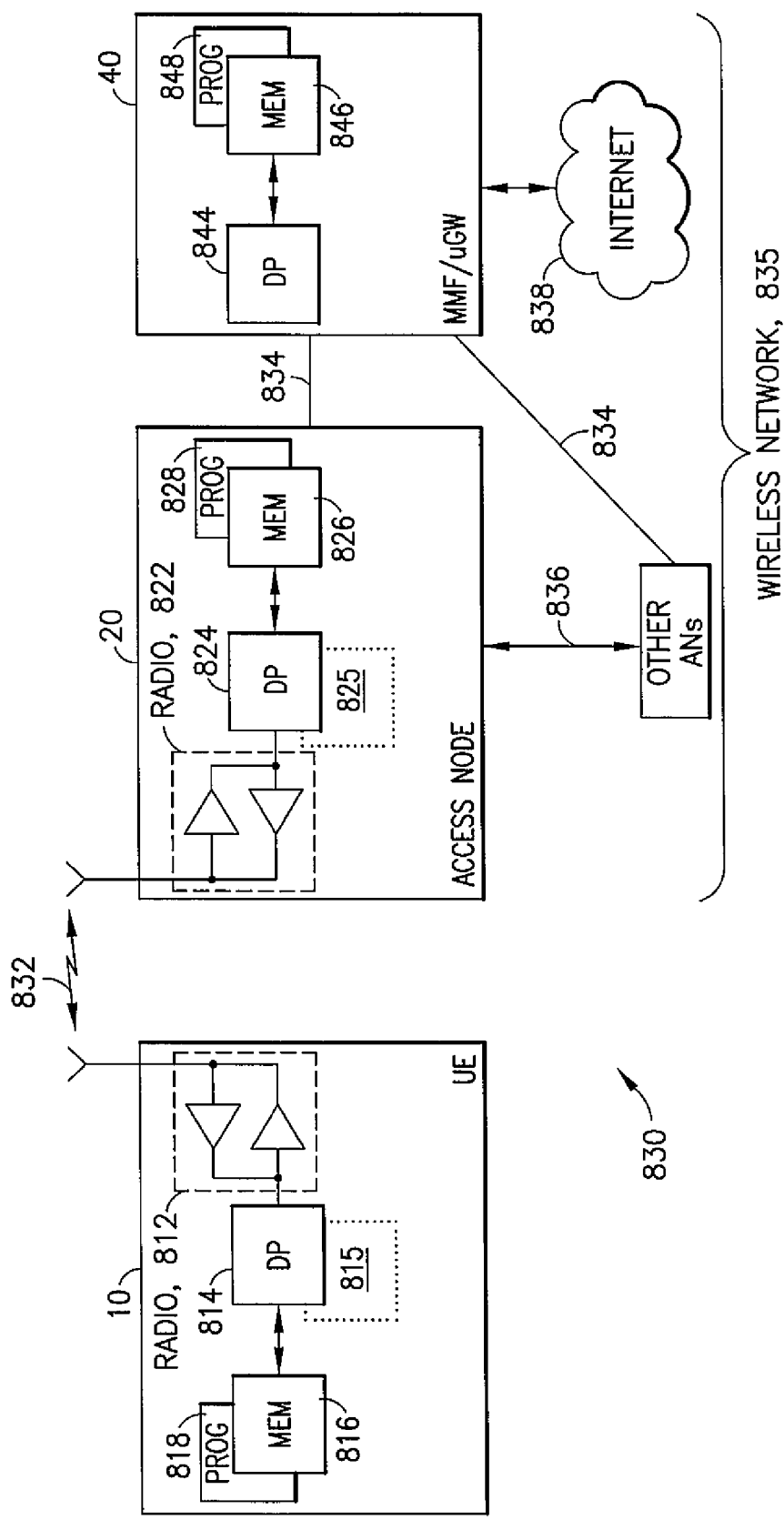
FIG. 8 is a diagram illustrating some components of a radio network access node/base station and a UE/mobile device, each of which are suitable for practicing various aspects of the invention.

FIG. 8 is a high level diagram illustrating some relevant components of various communication entities that may implement various portions of these teachings, including a base station identified generally as a radio network access node 20, a mobility management entity (MME) which may also be co-located with a user-plane gateway (uGW) 40, and a user equipment (UE) 10. In the wireless system 830 of FIG. 8 a communications network 835 is adapted for communication over a wireless link 832 with an apparatus, such as a mobile communication device which may be referred to as a UE 10, via a radio network access node 20. The network 835 may include a MME/Serving-GW 40 that provides connectivity with other and/or broader networks such as a publicly switched telephone network and/or a data communications network (e.g., the internet 838).

The UE 10 includes a controller, such as a computer or a data processor (DP) 814 (or multiple ones of them), a computer-readable memory medium embodied as a memory (MEM) 816 (or more generally a non-transitory program storage device) that stores a program of computer instructions (PROG) 818, and a suitable wireless interface, such as radio frequency (RF) transceiver or more generically a radio 812, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 8 is shown as having one MEM, in practice each may have multiple discrete memory devices and the relevant algorithm(s) and executable instructions/program code may be stored on one or across several such memories.

In general, the various embodiments of the LTE 10 can include, but are not limited to, mobile user equipments or devices, cellular telephones, smartphones, wireless terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The radio network access node 20 also includes a controller, such as a computer or a data processor (DP) 824 (or multiple ones of them), a computer-readable memory medium embodied as a memory (MEM) 826 that stores a program of computer instructions (PROG) 828, and a suitable wireless interface, such as a RF transceiver or radio 822, for communication with the UE 10 via one or more antennas. The radio network access node 20 is coupled via a data/control path 834 to the MME 40. The path 834 may be implemented as an S1 interface. The radio network access node 20 may also be coupled to other radio network access nodes via data/control path 836, which may be implemented as an X5 interface.

The MME 840 includes a controller, such as a computer or a data processor (DP) 844 (or multiple ones of them), a computer-readable memory medium embodied as a memory (MEM) 846 that stores a program of computer instructions (PROG) 848.

At least one of the PROGs 818, 828 is assumed to include program instructions that, when executed by the associated one or more DPs, enable the device to operate in accordance with exemplary embodiments of this invention. That is, various exemplary embodiments of this invention may be implemented at least in part by computer software executable by the DP 814 of the UE 10; and/or by the DP 824 of the radio network access node 20; and/or by hardware, or by a combination of software and hardware (and firmware).

For the purposes of describing various exemplary embodiments in accordance with this invention the UE 10 and the radio network access node 20 may also include dedicated processors 815 and 825 respectively.

The computer readable MEMs 816, 826 and 846 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 814, 824 and 844 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 812 and 822) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Below are some acronyms used herein:

| | |
|---|---|
| AP | Access Point |
| BS | Base Station (also eNB for enhanced nodeB) |
| DL | Downlink |
| DMRS | Demodulation Reference Symbols |
| DRX | Discontinuous Reception |
| MME | Mobility Management Entity |
| m-MIMO | Massive Multiple-Input Multiple Output |
| MIB | Master Information Block |
| mmWave | Millimeter wave |
| PRACH | Physical Random Access Channel |
| RACH | Random Access Channel |
| RSRP | Reference Signal Received Power |
| RSRQ | Reference Signal Received Quality |
| RX | Receive or Receiver |
| SIB | System Information Block |
| SR | Scheduling Request |
| SRS | Sounding Reference Signal/Symbol |
| TRP | Transmit-Receive Point |
| TX | Transmit or Transmitter |
| UE | User Equipment |
| uGW | user-plane gateway |
| UL | Uplink |
| URLLC | Ultra Reliable Low Latency Communication |

What is claimed is:

1. An apparatus comprising at least one processor and at least one memory tangibly storing a computer program, wherein the at least one processor is configured with the at least one memory and the computer program to cause the apparatus to perform actions comprising:
   determine a first match between a first transmit (TX) beam group of a radio network and a first receive (RX) beam group of a user equipment (UE);
   determine a second match between a second TX beam group of the radio network and a second RX beam group of the UE; and
   configure the UE with at least a first discontinuous reception (DRX) configuration associated with the first RX beam group and with a second DRX configuration associated with the second RX beam group such that the first and second DRX configurations are active simultaneously for the UE;
   wherein each said beam group comprises at least one antenna or antenna port.

2. The apparatus according to claim 1, wherein the first match and the second match are determined at least in part from a beam report received at the radio network from the UE, where the beam report indicates at least one best match for each of the first and second RX beam groups.

3. The apparatus according to claim 1, wherein the configuring comprises a single DRX cycle comprising first and second DRX ON periods.

4. The apparatus according to claim 1, wherein the configuring comprises configuring the UE with at least a first DRX cycle comprising a first DRX ON period and with a second DRX cycle comprising a second DRX ON period.

5. The apparatus according to claim 4, wherein at least some parameters that define the first DRX cycle are default parameters.

6. The apparatus according to claim 4, wherein the first DRX ON period defines a shorter duration than the second DRX ON period.

7. The apparatus according to claim 4, wherein a duration of the first DRX cycle is an integer multiple of a duration of the second DRX cycle.

8. The apparatus according to claim 1, wherein the first and second DRX configurations define first and second DRX ON periods respectively, the actions further comprising:
   switch a serving DRX ON period from the first DRX ON period to the second DRX ON period by sending to the UE signaling via the first TX beam group.

9. The apparatus according to claim 1, wherein the first and second DRX configurations define first and second DRX ON periods respectively, the actions further comprising:
   automatically when switching a serving beam group from the first RX beam group to the second RX beam group, establish an association of the second RX beam group with the first DRX ON period and an association of the first RX beam group with the second DRX period.

10. The apparatus according to claim 1, the actions further comprising:
   configure for the UE at least one of an uplink resource and a masking code specific for each of the first and second beam groups; and
   interpret signaling received on the first or second beam group specific uplink resource or with the first or second beam group specific masking code as a request by the UE to be served via said first or second beam group.

11. The apparatus according to claim 1, the actions further comprising:
   allocate a radio resource to the UE via the first TX beam group, and
   use the second TX beam group for hybrid automatic repeat request signaling associated with the allocated radio resource.

12. The apparatus according to claim 1, wherein the apparatus comprises a radio access node defining at least the first TX beam group.

13. An apparatus comprising at least one processor and at least one memory tangibly storing a computer program, wherein the at least one processor is configured with the at least one memory and the computer program to cause the apparatus to perform actions comprising:
   determine a first match between a first transmit (TX) beam group of a radio network and a first receive (RX) beam group of a user equipment (UE);
   determine a second match between a second TX beam group of the radio network and a second RX beam group of the UE; and in response to the UE being configured by the radio network, operate the UE with at least a first discontinuous reception (DRX) configuration associated with the first RX beam group and with a second DRX configuration associated with the second RX beam group such that the first and second DRX configurations are active simultaneously for the UE;

wherein each said beam group comprises at least one antenna or antenna port.

14. The apparatus according to claim 13, wherein the first match and the second match correspond to a beam report sent to the radio network by the UE, where the beam report indicates at least one best match for each of the first and second RX beam groups.

15. The apparatus according to claim 13, wherein the first and second DRX configurations comprises a single DRX cycle comprising first and second DRX ON periods.

16. The apparatus according to claim 13, wherein the first and second DRX configurations comprise at least a first DRX cycle comprising a first DRX ON period and with a second DRX cycle comprising a second DRX ON period.

17. The apparatus according to claim 13, wherein the first and second DRX configurations define first and second DRX ON periods respectively, the actions further comprising:
switch a serving DRX ON period from the first DRX ON period to the second DRX ON period in response to signaling via the first TX beam group received at the UE from the radio network.

18. The apparatus according to claim 13, wherein the first and second DRX configurations define first and second DRX ON periods respectively, the actions further comprising:
automatically when switching a serving beam group from the first RX beam group to the second RX beam group, establish an association of the second RX beam group with the first DRX ON period and an association of the first RX beam group with the second DRX period.

19. The apparatus according to claim 13, the actions further comprising:
receive at the UE from the radio network a further configuration comprising at least one of an uplink resource and a masking code specific for each of the first and second beam groups; and
request to be served via the first or second beam group by sending to the radio network signaling on said first or second beam group specific uplink resource or with the first or second beam group specific masking code.

20. The apparatus according to claim 13, the actions further comprising:
receive at the UE a radio resource allocation via the first TX beam group, and
use the second TX beam group for hybrid automatic repeat request signaling associated with the allocated radio resource.

* * * * *